(12) United States Patent
Kaus et al.

(10) Patent No.: US 7,167,172 B2
(45) Date of Patent: Jan. 23, 2007

(54) METHOD OF SEGMENTING A THREE-DIMENSIONAL STRUCTURE CONTAINED IN AN OBJECT, NOTABLY FOR MEDICAL IMAGE ANALYSIS

(75) Inventors: Michael Kaus, Hamburg (DE); Anja Hennemuth, Hamburg (DE); Vladimir Pekar, Hamburg (DE); Juergen Weese, Henatedt-Ulzburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 594 days.

(21) Appl. No.: 10/091,050

(22) Filed: Mar. 5, 2002

(65) Prior Publication Data

US 2003/0020714 A1    Jan. 30, 2003

(30) Foreign Application Priority Data

Mar. 9, 2001    (DE) ............................... 101 11 661

(51) Int. Cl.
*G06T 15/00*    (2006.01)
(52) U.S. Cl. ..................... 345/419; 345/418; 345/420; 382/285; 382/173; 382/154; 382/128
(58) Field of Classification Search ........ 382/128–132, 382/285, 173–180, 154; 345/418–420, 423
See application file for complete search history.

(56) References Cited

U.S. PATENT DOCUMENTS

| | | | |
|---|---|---|---|
| 6,106,466 A * | 8/2000 | Sheehan et al. | 600/443 |
| 6,201,543 B1 * | 3/2001 | O'Donnell et al. | 345/420 |
| 6,295,464 B1 * | 9/2001 | Metaxas | 600/407 |
| 6,546,117 B1 * | 4/2003 | Sun et al. | 382/103 |

OTHER PUBLICATIONS

McInerney et al., "Deformable models in medical image analysis: a survey"; Medical Image Analysis, 1 (2);pp. 91 to 108, 1996.

\* cited by examiner

*Primary Examiner*—Bhavesh M Mehta
*Assistant Examiner*—Patrick Edwards

(57) ABSTRACT

The invention relates to a method of segmenting a three-dimensional structure, contained in an object, from one or more two-dimensional images which represent a slice of the object. The method utilizes a deformable model whose surface is formed by a network of meshes which connect network points on the surface of the model to one another. First there are determined the meshes which intersect at least one image and a point on the surface of the structure to be segmented is searched along a search line which traverses the mesh and extends in the image. Subsequently, the position of the network points of the model is calculated anew. These steps are repeated a number of times and the model ultimately obtained, that is, after several deformations, is considered to be the segmentation of the three-dimensional structure from the two-dimensional images.

9 Claims, 3 Drawing Sheets

Figure 1:
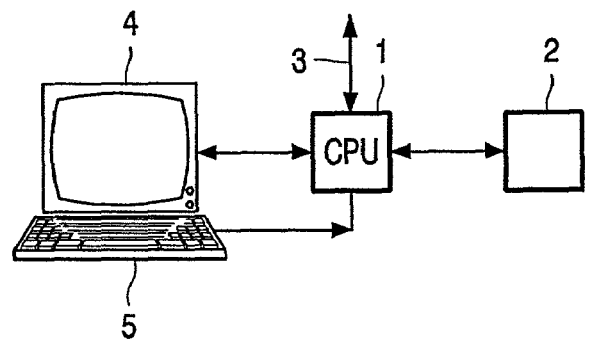

METHOD OF SEGMENTING A THREE-DIMENSIONAL STRUCTURE CONTAINED IN AN OBJECT, NOTABLY FOR MEDICAL IMAGE ANALYSIS

The invention relates to a method of segmenting a three-dimensional structure, which is contained in an object, from at least one two-dimensional image which represents a slice of the object, which method utilizes a deformable model whose surface is formed by a network of meshes which interconnect network points on the surface of the model. The invention also relates to an image processing device for carrying out the method and to a computer program which is suitable for this purpose.

Methods of this kind are known from an article by McInerney et al. "Deformable models in medical image analysis: a survey" published in the magazine Medical Image Analysis, 1 (2): pp. 91 to 108, 1996. In conformity with the cited article, a deformable model may be represented as an elastic surface whose shape and position can change under the influence of an internal energy and an external energy. The internal energy serves to preserve as well as possible the shape of the model (which may have been formed on the basis of advance medical knowledge concerning the structure to be segmented). The external energy, however, should move the model surface in the direction of the object edges. The external energy is derived from a three-dimensional image, that is, from a data set which is a three-dimensional representation of the object containing the structure. The meshes are preferably shaped as triangles whose corner points are defined by three neighboring network points on the surface of the model.

According to the known method structure points are searched on the surface of the structure to be segmented, that is, along search lines which extend perpendicularly to the triangular surfaces in the image; the surface is usually characterized by a pronounced gradient of the image data. After the determination of such structure points for the meshes of the network defining the surface of the model, the network points of the model are calculated anew on the basis of the structure points found, that is, the network points are calculated in such a manner that the weighted sum of the internal energy and the external energy assumes a minimum value for the newly found network points. According to this method the position of the network points is influenced not only by the directly neighboring structure points found during the search, but also by all other structure points. Subsequently, the method is repeated (iteratively) a number of times while utilizing the newly calculated network points. The model is deformed upon each iteration and the shape assumed by the model after the last iteration is considered to be the structure to be segmented in the concrete object.

A three-dimensional image of the object is a prerequisite for this known method. During medical examinations such an image is generated by means of an (X-ray) computed tomography method or by means of an MR (=magnetic resonance) method. The acquisition of the data for a three-dimensional image takes a comparatively long period of time and also involves, that is, in the case of computed tomography, a significant exposure of the object to radiation.

It is an object of the present invention to provide a method of the kind set forth which requires only a few two-dimensional images for the segmentation of a three-dimensional structure; a small number of two-dimensional images can be acquired much faster (and, if applicable, with a much smaller radiation load) than a three-dimensional image.

This object is achieved in accordance with the invention by means of a method for segmenting a three-dimensional structure which is contained in an object from at least one two-dimensional image which represents a slice of the object, which method utilizes a deformable model whose surface is formed by a network of meshes which interconnect network points on the surface of the model, and which method includes the steps of:
a) determining the meshes which intersect the image,
b) searching, for each mesh determined in the step a), a respective structure point, situated on the surface of the structure, along a search line which traverses the mesh and extends in the image,
c) calculating anew the network points of the model on the basis of the structure points found, and
d) repeating the steps a) to c) a number of times on the basis of the newly calculated network points.

In accordance with the invention the search lines along which structure points are searched extend in the image (that is, in the image plane) and not perpendicularly to the surface of the meshes. A structure point is not searched for all meshes of the model, but only for those meshes which intersect the image. Nevertheless, the comparatively few structure points found in this manner suffice for a recalculation of all network points, that is, not only for the network points situated in the vicinity of the small number of structure points. It has been found that the quality of the segmentation is comparable to that of a segmentation found on the basis of a three-dimensional image. Because only comparatively few structure points need be searched, the segmentation requires far less calculation time than in the known method.

In one aspect of the invention the line which extends perpendicularly to the mesh (that is, the normal to the triangle) defined by three neighboring network points) is projected onto the image plane and hence defines the search direction. Other search directions, however, are also possible in principle, for example, in the direction of the gradient of the image.

In another aspect of the invention, the zone of the search line along which a structure point is searched is limited. This limitation on the one hand reduces the duration of the search and on the other hand provides robustness against noise. Claim 4 discloses the preferred position of this search zone.

Further disclosed is an image processing device which is suitable for carrying out the method in accordance with the invention and a computer program which is suitable for such an image processing device.

Figure 2:
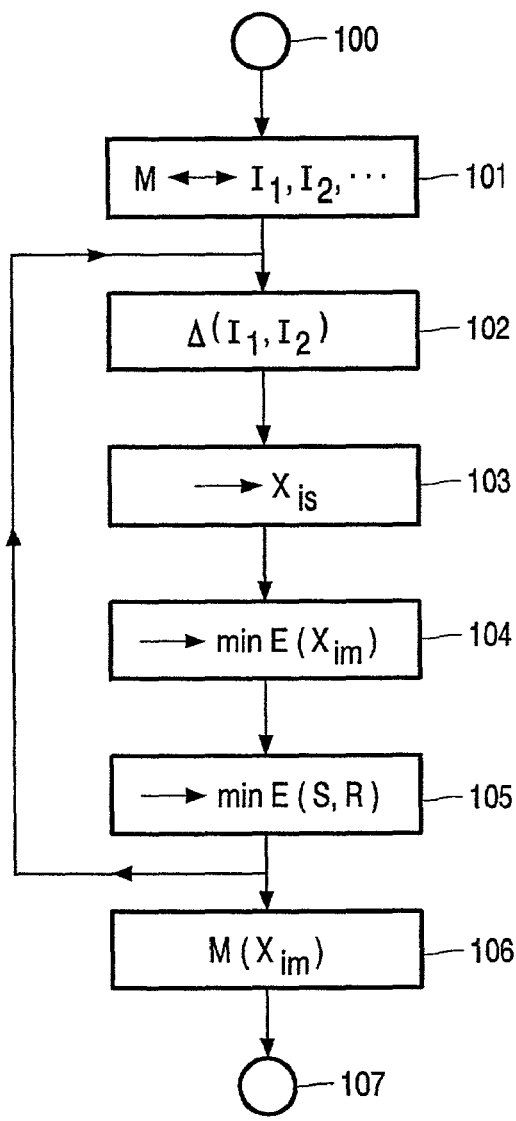
Figure 3:
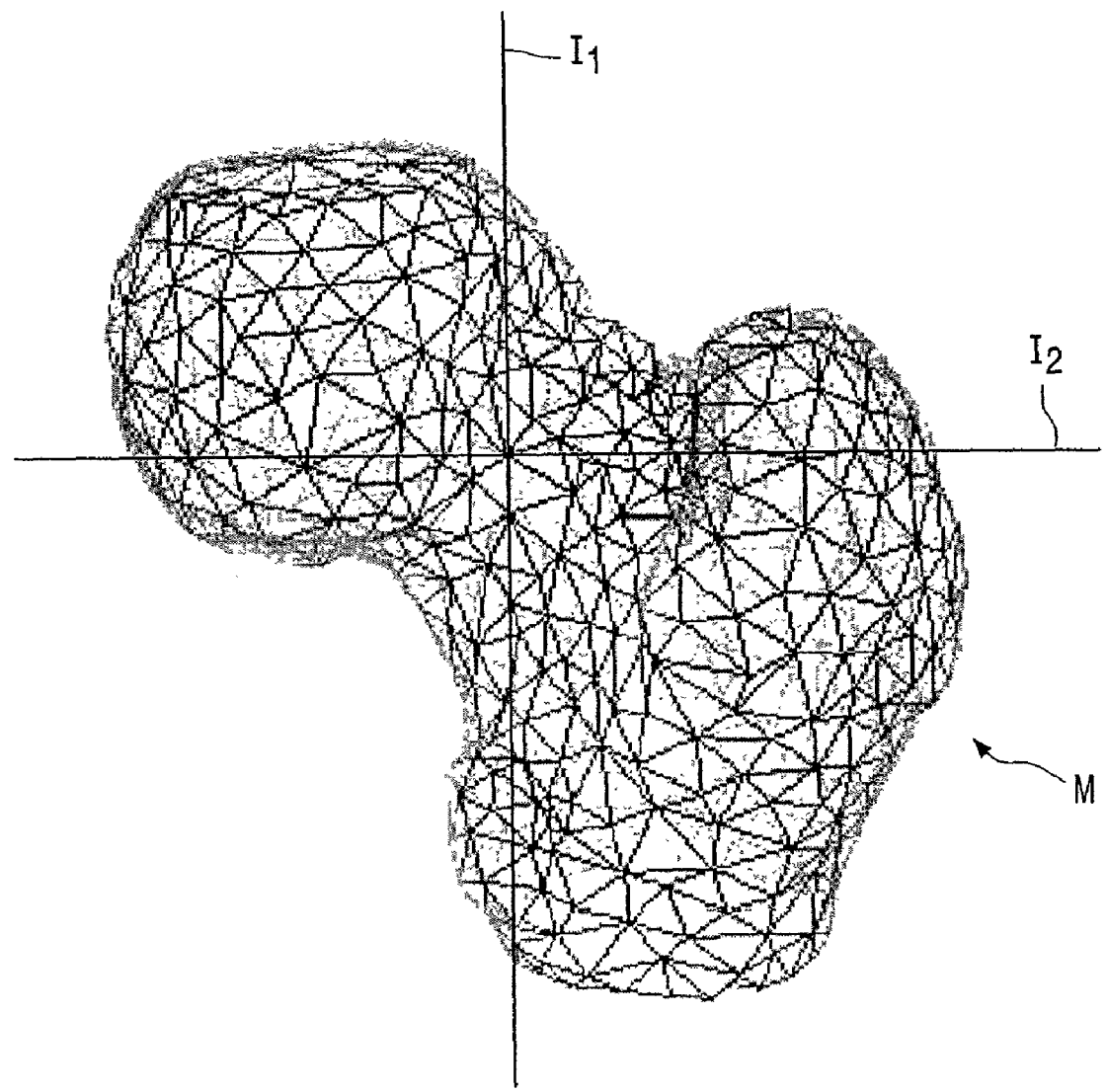
Figure 4:
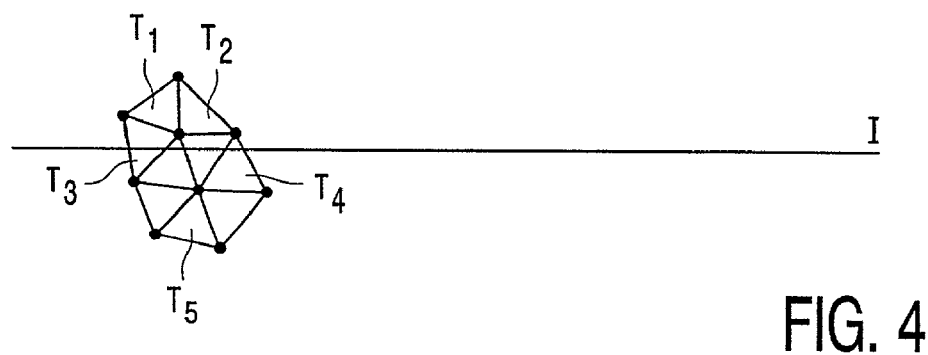
Figure 5:
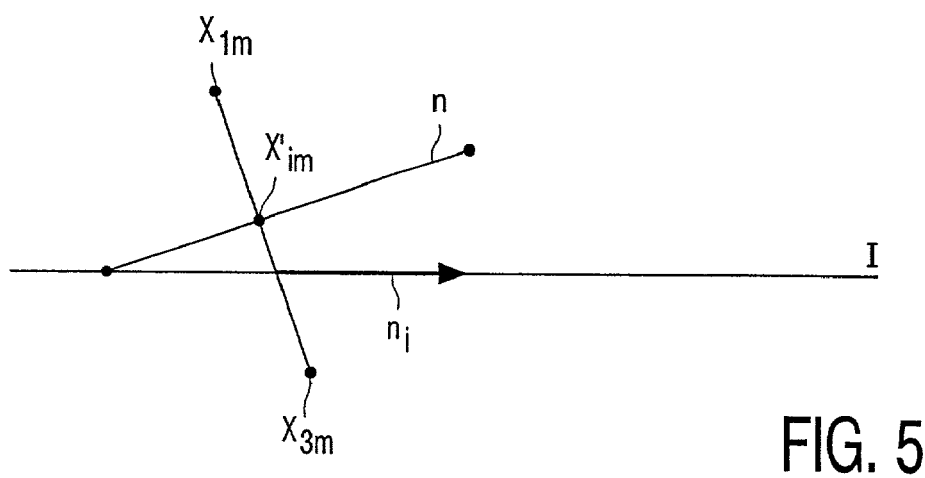
Figure 6:
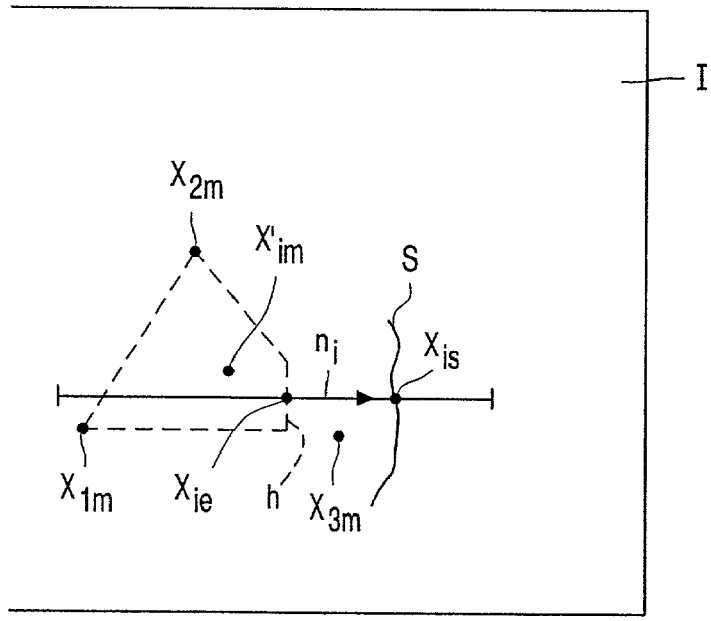

The invention will be described in detail hereinafter with reference to the drawings. Therein:

FIG. 1 is a diagrammatic representation of an image processing device that is suitable for carrying out the method in accordance with the invention, FIG. 2 shows a flow chart illustrating the execution of the method in accordance with the invention, FIG. 3 shows the relative position of a model and two images, FIG. 4 shows a part of the model and the plane of one of the images, FIG. 5 is a side elevation of a triangle which intersects the image plane, and FIG. 6 is a plan view of such a triangle.

The image processing device shown in FIG. 1 includes an image processing and control processor 1 with a memory 2 in which a deformable model of a structure to be segmented can be stored and which is capable of storing one or more two-dimensional images of an object to be examined. The image processing and control processor may be coupled, via a bus system 3, to an imaging device (not shown), for example, an MR apparatus or a CT apparatus. The structure segmented by the image processing and control processor can be displayed on a monitor 4. The user can access the image processing processor via a keyboard 5 or other input means which are not shown in FIG. 1.

FIG. 2 shows a flow chart of the computer program on the basis of which the image processing device carries out the segmentation of a structure. After the initialization in the step 100, in the step 101 the model M of a structure to be segmented is loaded as well as one or more images which represent a slice of an object containing such a structure.

FIG. 3 shows a deformable model M, in this case being the model of the femur head (caput femoris) at the upper end of the thighbone. Other structures, of course, can also be segmented by means of a deformable model, for example, a vertebra in the spinal column or an organ, for example, the heart. The surface of the object is formed by a network whose triangular meshes connect each time three neighboring network points on the surface of the model to one another.

Instead of a model thus subdivided into triangles, the surface could also be defined by a polygonal structure in which the meshes of the network do not have a triangular shape but link a number of network points other than three to one another in the form of a polygon.

FIG. 3 also shows the planes of two two-dimensional images $I_1$ and $I_2$ which extend perpendicularly to the plane of drawing and represent a slice of the object which contains, in addition to other anatomical characteristics, the structure to be segmented. In this example the structure is segmented by means of two mutually perpendicular images. However, these images may also represent differently oriented slices, for example, parallel slices. It is important only that they reproduce as many anatomical details of the structure as possible. When three two-dimensional images are used instead of two, usually even better segmentation is achieved. It is in principle also possible to utilize only a single two-dimensional image for the segmentation, be it that generally the quality of the segmentation then suffers.

In the step 101 additionally the images $I_1$ and $I_2$ on the one hand and the model M on the other hand are oriented relative to one another in such a manner that the cross-section of the model in cross-sectional planes defined by the image planes corresponds as well as possible to the contours of the structure in the images $I_1$ and $I_2$. The remainder of the method is executed automatically as from this interactive selection.

In the step 102 it is determined which meshes of the network defining the surface of the model intersect the plane of the images $I_1$ or $I_2$, that is, which meshes connect network points situated to both sides of the image plane to one another. This is shown in FIG. 4, in which the plane of the image which extends perpendicularly to the plane of drawing is denoted by the reference I and the triangles $T_1 \ldots T_5$ represent some of the triangular meshes of the model. All corner points of the meshes $T_1$ and $T_2$ are situated above the image plane I, and all corner points of the mesh $T_5$ are situated underneath the image plane I. However, the corner points of the mesh $T_3$ are situated to both sides of the image plane, like those of the mesh $T_4$. These meshes thus intersect the image plane I.

During the next step 103, structure points in the images which are situated in the vicinity of the relevant mesh are determined for all meshes which intersect the image planes. In this respect reference is made to FIG. 5 which shows the image plane I perpendicular to the plane of drawing and the plane of a triangle perpendicular to the plane of drawing. Therefore, only the corner point $x_{1m}$ above the image point I and the corner point $x_{3m}$ underneath the image plane I of the triangle can be recognized. The triangle intersects the image plane at an angle other than 90°. Consequently, the normal n to the center $x'_{im}$ of the triangle also punctures the image plane at an angle and in a single point. The search for a structure point in the image, therefore, is carried out along a line $n_i$ which extends in the image plane I and whose direction corresponds to the direction of the projection of the normal n on the image plane I (the projection of the normal and the normal n itself are situated in a plane extending perpendicularly to the image plane I).

The starting point of the search line $n_i$ is the center $x_{ie}$ of the line h, in which the triangle intersects the image plane I. As is indicated in FIG. 6, in which the plane of drawing extends parallel to the image plane, a search is performed on the line $n_i$ in a limited zone only around the point $x_{ie}$. The calculation time is thus reduced and it is also avoided that points which are situated at a comparatively long distance (that is, to the other side of the search zone) can be identified as points of the structure S searched.

The following equation then holds for the structure point $x_{is}$ found during the search in the step 103:

$$x_{is}=x_{ie}+\delta j_i n_i \quad (1)$$

As has already been explained, $x_{ie}$ therein is the center of the search zone and the line of intersection h, $n_i$ is a vector of length 1 which characterizes the direction of the search line, $\delta$ is a scale factor corresponding to the distance between two points succeeding one another on the search line, and $j_i$ is that integer value of j for which the function $$f(j)=Dj^2\delta^2-F(x_{ie}+j\delta n_i) \quad (2)$$

has a minimum. Therein, D is a suitably chosen constant and the function F(x) is calculated in conformity with the relation:

$$F(x)=\pm n_i g(x) \quad (3)$$

Therein, g(x) is the gradient of the image or the brightness value in the image at the position x. Because the function F(x) thus corresponds to the scalar product of the vectors $n_i$ and g(x), it becomes particularly large when the gradient of the image extends in the search direction, that is, when the search direction extends perpendicularly to the interface of the structure S (see FIG. 6) (it being assumed that the image or brightness values change at this interface). The sign of the function F(x) in the equation 2 is chosen to be such that this term becomes positive in the case of an interface as defined herein. The value D ensures that the points on the structure which are situated nearest to the starting point $x_{ie}$ are given preference and that the method becomes more stable. If D were equal to 0, structure points situated at a large distance and those situated nearby would have the same priority and the length of the search zone would be a decisive factor in respect of the segmentation.

After a structure point $x_{is}$ has thus been found for all triangles determined in the step 102, the surface of the deformable model is adapted to the structure points found (steps 104 and 105). The position of the network points (that is, the corner points of the triangles) is then varied in such a manner that the so-called energy function $$E=E_{ext}+\alpha E_{int} \quad (4)$$

assumes a minimum value. Therein, $E_{ext}$ is the external energy which pulls the network towards the structure points found whereas $E_{int}$ is the internal energy which tends to oppose a deformation of the network. The external energy $E_{ext}$ is then calculated in conformity with the following relation:

$$E_{ext} = \sum_\Delta w_i \left( \frac{g(x_{is})}{\|g(x_{is})\|} (x'_{im} - x_{is}) \right)^2 \quad (5)$$

in which summing takes place over all triangles. Therein, $x'_{im}$ denotes the co-ordinates of the center of a triangle, $g(x_{is})$ is the gradient of the image in the structure point $x_{is}$, and $w_i$ is a weighting factor with which the effect of the structure points on the external energy is weighted in conformity with the relation:

$$w_i = \max\{0, F(x_{ie} + j\delta n_i) - Dj^2\delta^2\} \quad (6)$$

In conformity with the equation 6 the weight is zero for all triangles for which the second term in accolades either does not exist (because the relevant triangle has not intersected any of the image planes) or is negative (because the structure point found contains the characteristics of the structure to an inadequate extent only). All these triangles (or the structure points possibly determined for these triangles), therefore, do not make a contribution to the external energy. The other triangles make a contribution amounting to $F(x_{ie} + j\sigma n_i) - Dj^2\sigma^2$, which contribution is larger as the structure characteristics in the structure point $x_{is}$ found are more pronounced. Moreover, the contribution is also dependent on the direction of the gradient in the structure point relative to the vector which points from the center of the triangle to the structure point; it is maximum when these directions are parallel or anti-parallel.

The internal energy $E_{int}$ is calculated in conformity with the relation $$E_{int} = \sum_{i=1}^{K} \sum_{j} ((x_{im} - x_{jm}) - sR\Delta_{ij})^2 \quad (7)$$

Therein, s is a scaling factor, R is the rotation matrix and $\Delta_{ij}$ is the distance between the network point $x_i$ and a neighboring network point $x_j$ in the non-deformed model M. When the loop is completed for the first time, s=1 and R corresponds to the unity matrix (which means that the diagonal elements have the value 1 and all other matrix elements have the value 0).

In accordance with the equation 7 summing takes place over all K network points of the model, it being necessary each time to determine the distances from the surrounding network points $x_{jm}$.

Therefore, in the step 104 new co-ordinates $x_{im}$ are calculated for the model, that is, in such a manner that the energy determined in conformity with the equations 4 to 7 assumes a minimum value (it is to be noted that the center $x'_{im}$ of a triangle in the equation 5 can be derived from the corner points $x_{im}$ of the associated triangle). The determination of the co-ordinates $x_{im}$ for which the energy E has a minimum value actually comes down to solving a linear system of equations with 3K equations, where K is the number of network points of the model.

Subsequently, on the basis of the newly calculated co-ordinates $x_{im}$ of the network points there is determined that scaling factor s, or that rotation R, for which the energy function in conformity with the equation 7 with the updated values of $x_{im}$ and $x_{jm}$ has a minimum value. The sequence of the steps 104 and 105 can also be interchanged. When the loop is completed for the first time, the calculation of the values s and R would then be omitted and s and R would be calculated anew only during further completions of the loop. The two steps 104 and 105 can also be carried out simultaneously. The linear system of equations is then extended with four equations to 3K+4 equations.

Subsequently, the loop 102 . . . 105 is completed again, that is, on the basis of the values determined during the steps 104 and 105. Because of this modification of the model, some of the triangles that previously did not intersect an image plane may now intersect an image plane or vice versa. After the loop 102 . . . 105 has been completed so many times that an interrupt criterion is met (for example, when the position of the network points hardly changes any more), or after a fixed number of completions (for example, from 30 to 50), the model obtained after multiple deformation is stored in the step 106 so as to be displayed on the monitor. This deformed model then represents the segmentation of the three-dimensional structure contained in the two-dimensional images of the object, being the segmentation of the femur head in the present example. This completes the execution of the method.

The invention claimed is:

1. A method of segmenting a three-dimensional structure, which is contained in an object, from at least one two-dimensional image ($I_1$, $I_2$) which represents a slice of the object, the method utilizing a deformable model (M) whose surface is formed by a network of meshes which interconnect network points on the surface of the model, and which method includes the steps of:
   a) determining the meshes ($T_3$, $T_4$) which intersect the image ($I_1$, $I_2$),
   b) searching, for each mesh determined in the step a), a respective structure point ($x_{is}$), situated on the surface of the structure, along a search line ($n_i$), which traverses the mesh, extends in the image plane I and whose direction corresponds to the direction of the projection of the normal n onto image plane I, wherein the projection of the normal and the normal n itself are situated in a plane extending perpendicularly to the image plane I and perpendicularly to line segments of the meshes which intersect the image,
   c) calculating anew the network points ($x_{im}$) of the model (M) on the basis of the structure points ($x_{is}$) found.

2. A method as claimed in claim 1, in which the direction of the search line ($n_i$) corresponds to the projection of a line perpendicular to the mesh onto the plane of the image.

3. A method as claimed in claim 1, in which the search for a structure point is limited to a zone of the search line which is symmetrically situated relative to the line of intersection (h) of the mesh and the plane of the image.

4. A method as claimed in claim 1, in which the search lines extend through the centers of the lines of intersection of the meshes and the plane of the image.

5. The method as claimed in claim 1, further comprising the step of:
   d) repeating the steps a) to c) a number of times on the basis of the newly calculated network points.

6. An image processing device which includes:
   a memory for storing a deformable model whose surface is formed by a network of meshes which interconnect network points on the surface of the model, and for storing at least one two-dimensional image which represents a slice of an object, an image display unit for displaying a segmented structure, and image processing means for segmenting a three-dimensional structure which is contained in the object, which segmentation operation comprising the steps of:

a) determining the meshes which intersect the image,
b) searching, for each mesh determined in the step a), a respective structure point, situated on the surface of the structure, along a search line which traverses the mesh and extends along a line $n_i$ which extends in the image plane I and whose direction corresponds to the direction of the projection of the normal n on the image plane I, wherein the projection of the normal and the normal n itself are situated in a plane extending perpendicularly to the image plane I and perpendicularly to line segments of the meshes which intersect the image,
c) recalculating the network points of the model on the basis of the structure points found.

7. The image processing device as claimed in claim 6, further comprising the step of:

d) repeating the steps a) to c) a number of times on the basis of the newly calculated network points.

8. A computer program for an image processing unit for segmenting a three-dimensional structure, which is contained in a object, from at least one two-dimensional image which represents a slice of the object, which computer program utilizes a deformable model whose surface is formed by a network of meshes which interconnect network points on the surface of the model, and which computer program provides instruction to a computing system to execute the steps of:

a) determining the meshes which intersect the image,
b) searching, for each mesh determined in the step a), a respective structure point, situated on the surface of the structure, along a search line which traverses the mesh and extends along a line $n_i$ which extends in the image plane I and whose direction corresponds to the direction of the projection of the normal n on the image plane, wherein the projection of the normal and the normal n itself are situated in a plane extending perpendicularly to the image plane I and perpendicularly to line segments of the meshes which intersect the image,
c) calculating anew the network points of the model on the basis of the structure points found.

9. The computer program as claimed in claim 8, further providing instruction to a computing system to execute the step of:

d) repeating the steps a) to c) a number of times on the basis of the newly calculated network points.

* * * * *